June 17, 1958 E. R. SARRATT 2,839,615
MAGNETIC RECORD REPRODUCTION
Filed Aug. 20, 1954
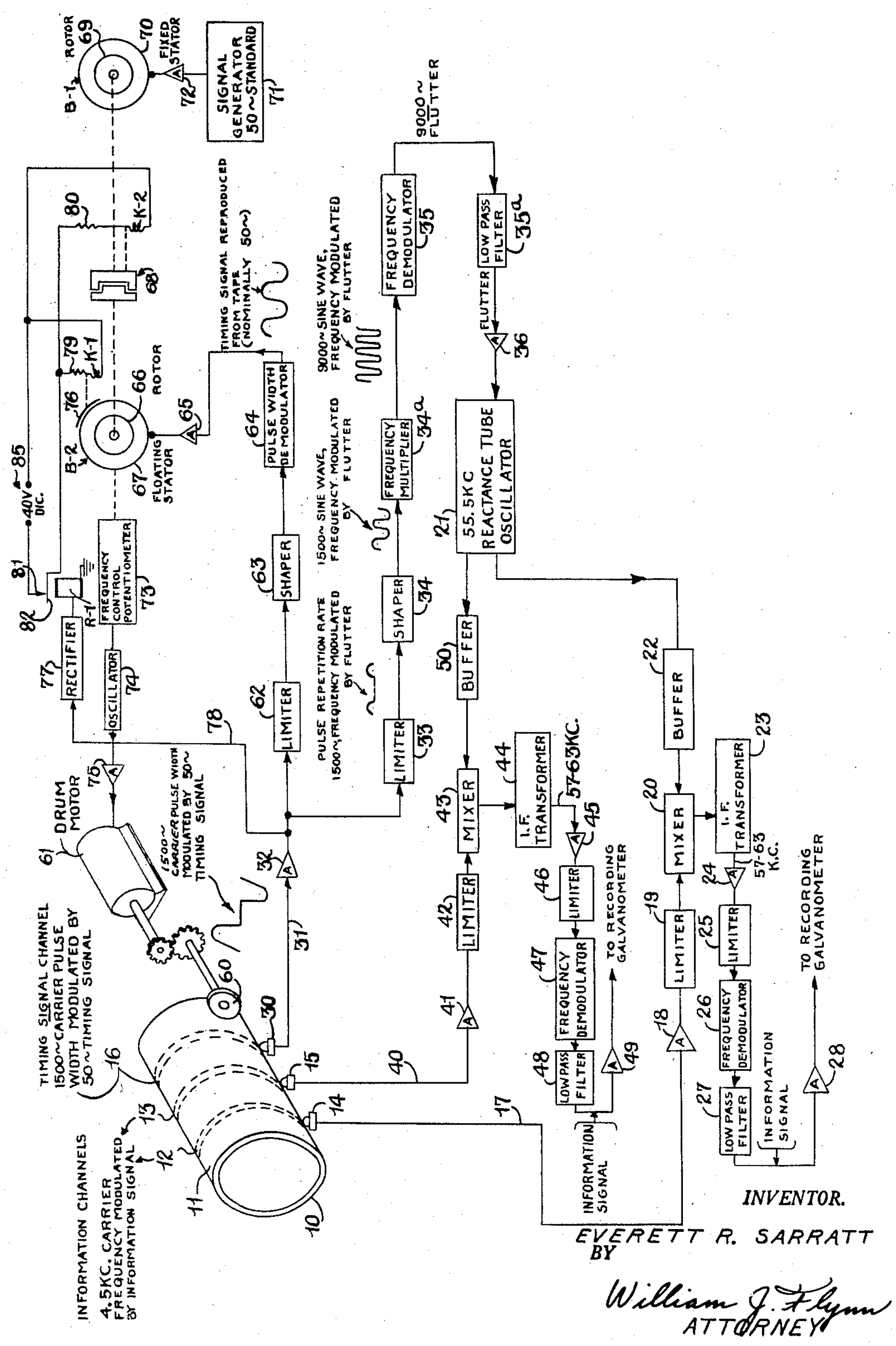
INVENTOR.
EVERETT R. SARRATT
BY
William J. Flynn
ATTORNEY

United States Patent Office 2,839,615

Patented June 17, 1958

2,839,615

MAGNETIC RECORD REPRODUCTION

Everett R. Sarratt, Paterson, N. J., assignor to Clevite Corporation, Cleveland, Ohio, a corporation of Ohio Application April 20, 1954, Serial No. 424,329

9 Claims. (Cl. 179—100.2)

This invention relates to an arrangement for reproducing a magnetically recorded signal, and is particularly concerned with such an arrangement for reproducing information signals from a magnetic recording in which each information signal frequency modulated a respective carrier signal which was then recorded magnetically.

In the copending application of S. J. Begun et al., Serial No. 402,388, filed January 5, 1954, now Patent No. 2,803,515, issued August 20, 1957, there is disclosed and claimed a magnetic recording system for geophysical exploration work in which information signals from geophones are used to frequency modulate audio frequency carrier signals, which are then recorded magnetically on a multichannel magnetic record tape. For proper interpretation of such recordings it is necessary to reproduce the information signals falling within the frequency range from 20 to 500 cycles per second. However, since the frequency of the carrier signals used in the recording process was low (one practical embodiment having a carrier frequency of 4,500 cycles per second, with a maximum frequency deviation of plus or minus 2000 cycles per second), this would present a difficult problem of filtering out the carrier frequency signals from the information signals after having demodulated the magnetically recorded signals. Obviously, it would be quite difficult to provide a filter, not prohibitive in cost, which would have a substantially linear response over the entire information signal frequency range from 20 to 500 cycles per second and which would also adequately reject the relatively close-by carrier frequency signals.

The present invention is concerned with a novel arrangement for recovering the information signals from such a relatively close-by frequency modulated carrier which has been magnetically recorded.

Accordingly, it is an object of this invention to provide a novel and improved arrangement for recovering the information signals from an FM magnetic recording.

Another aspect of reproducing such a magnetic recording, which may assume serious proportions in some instances, is the occurrence of tape "flutter" during playback. By "flutter" is meant instantaneous variations in tape speed during the reproduction, or playback, sequence as compared with its speed during the magnetic recording interval. As is well understood, with conventional magnetic recording and playback heads the response is determined by the speed at which the magnetic record medium moves past the magnetic playback head. Therefore, unless precautions are taken to maintain the record speed substantially constant during playback, serious errors may be introduced in reproducing the magnetic recording.

The present invention incorporates a novel arrangment for compensating for tape "flutter" during the playback of an FM magnetic recording of the general type described above.

Accordingly, it is also an object of this invention to provide a novel and improved arrangement for compensating for instantaneous variations in speed of the magnetic recording medium during playback of an FM magnetic recording.

Still another factor which may introduce errors into the reproduction of the magnetically recorded signals is the possibility that the magnetic record tape may become either stretched or contracted, as compared with its length during the magnetic recording operation, upon being transferred from the magnetic recording unit to the reproduction unit. If such is the case, unless such tape stretch or contraction is compensated for the playback signals would be at correspondingly higher or lower frequencies than the magnetically recorded information signals and the reproduction would be in error to that extent.

In accordance wtih the present invention such changes in the tape length, or any other operating conditions which tend to produce errors of a non-instantaneous type (such as slow changes in the tape speed during playback), are compensated for by a servo-mechanism arranged to control the tape speed during playback in accordance with a phase comparison between a timing signal recovered from the magnetic record tape and a precisely controlled reference timing signal. Should there be an error in the frequency relationship between the reproduced timing signal and the reference timing signal, due to moving the record tape either too fast or too slow during playback, then the phase detector apparatus in the servo-mechanism actuates the record tape drive to correct such errors in tape speed.

Accordingly it is also an object of this invention to provide in a magnetic reproduction unit a servo-mechanism to compensate for non-instantaneous changes in the speed at which the information signal channels move past the playback heads, as compared with the rate during the magnetic recording interval, which incorporates a phase detector which responds to any error in the frequency relationship between the reproduced timing signal and a precise reference signal to control the speed at which the record moves during playback so as to correct for such speed changes.

For the accomplishment of the foregoing purposes, as well as such further objects and advantages of the present invention as will be apparent hereinafter, there may desirably be provided the specific arrangement described in detail hereinafter and illustrated schematically in the accompanying drawing. However, it is to be understood that this invention is susceptible of various embodiments different from that described herein. Also, while this invention is particularly suitable for use in conjunction with the geophysical recording arrangement disclosed in the above-mentioned copending application Serial No. 402,388, it is to be understood that the present invention is not limited to that particular use but is of general utility where a device having the characteristics of this invention is desired.

In the drawings, the figure is a schematic view, with the electrical components shown in block diagram form, showing the reproducing arrangement of the present invention.

Referring to the drawing, in the reproducer there may be provided a rotary drum 10 which provides a support for a multi-channel magnetic record tape 11. The drum 10 is driven frictionally by a rotary rubber-tired idler wheel 60 driven by the drum motor 61. In one practical embodiment, the drum speed is such that it completes one rotation in five seconds. Ordinarily, a five second magnetic recording interval is sufficient for geophysical exploration signal recording purposes, and with an equal record speed during playback the same time interval is involved in reproducing the signals which were recorded magnetically. In the simplified version illustrated, the magnetic tape 11 has separate information channels 12 and 13, respectively, which move past conventional magnetic reproducing heads 14 and 15, respectively. In actual practice there may be several more information signal channels on the magnetic record, with a corresponding number of playback channels in the reproducer. In this particular embodiment, these information channels contain magnetically recorded signals each composed of a 4500 cycle per second carrier signal which is frequency modulated by the information signal from a respective geophone, this information signal being in the frequency range from 20 to 500 cycles per second. At another channel 16 on the magnetic record tape 11 there has been recorded a timing signal in the form of a 1500 cycle per second carrier which is pulse width modulated by a 50 cycle per second timing signal.

*Information signal reproduction*

From the magnetic reproducing head 14, as the drum 10 rotates to move the information channel 12 past this magnetic head, electrical signals representative of the magnetically recorded signals at channel 12 are supplied through line 17 to a two-stage voltage amplifier 18. From the amplifier 18 the signals are supplied to an amplitude limiter 19, and from there to the input of a mixer 20. It is to be understood that this signal to the mixer falls within the frequency range from 2500 to 7000 cycles per second since the mean frequency of the magnetically recorded carrier at channel 12 was 4500 cycles per second, with a maximum frequency deviation of plus or minus 2000 cycles per second.

In the mixer 20 this signal is heterodyned against a normally 55.5 kc. signal, which is supplied to the mixer from an oscillator 21 through a buffer 22. The output signals from mixer 20 are supplied to an I. F. transformer 23 designed to pass frequencies within the range from 57 to 63 kc. only, so that only the sum frequencies produced in the mixer by the heterodyning of the 55.5 kc. oscillator signal and the magnetically recorded signals are passed. It will be understood that this heterodyned sum frequency signal has a mean frequency which is the sum of the frequency of the signal from oscillator 21 (nominally 55.5 kc.) and the mean frequency of the magnetically recorded carrier signal (4.5 kc.), this sum frequency signal being modulated in frequency by the information signal recorded magnetically. From this I. F. transformer the sum frequency signals are passed to an amplifier 24 and from there through an amplitude limiter 25 to a frequency demodulator 26 in which the geophone information signal, falling within the frequency range from 20 to 500 cycles per second, is recovered from the sum carrier frequency signal, which is 60 kc. after having been heterodyned as described.

The geophone information signal and the sum carrier frequency signals are fed to a band pass filter 27, which passes the low frequency geophone information signals but rejects the 60 kc. carrier signal. The filter 27 has a substantially linear response over the frequency range from 20 to 500 cycles per second, so that it introduces no distortion of the geophone information signal. From filter 27 the geophone information signal is supplied to an amplifier 28, whose output is connected to a photographic recording galvanometer of conventional design for producing a photographic line signal representative of the geophone information signal which had been magnetically recorded.

It will be recognized that with the foregoing arrangement the filtering of the information signals from the carrier signal is facilitated by virtue of the frequency multiplication of the carrier before frequency demodulation and filtering. In the absence of this novel arrangement, it would be quite difficult to filter the information signals from the close-by carrier reproduced from the magnetic record because of the closeness of the respective band widths. However, by raising the carrier to the higher frequency level indicated it is a relatively simple matter to separate the information signals from the carrier without distorting the information signals to any significant extent.

*Flutter compensation*

With the foregoing arrangement, as is true generally of apparatus for reproducing magnetic recordings, the accuracy of the reproduction depends upon moving the magnetic record at a uniform speed during playback, having a fixed relation to the speed at which it was moved during the magnetic recording interval. When this cannot be conveniently accomplished in practice, it may be desirable to provide an arrangement which compensates for instantaneous speed variations during playback, commonly referred to as "flutter." To this end the present invention incorporates a practical flutter compensating arrangement.

At the timing signal channel 16 on the multi-channel magnetic record there has been recorded a 1500 cycle per second carrier signal which is pulse width modulated by a 50 cycle per second timing signal. A magnetic reproducing head 30 of conventional design is positioned to reproduce this PWM signal at channel 16 as drum 10 rotates to move this signal channel past head 30. Accordingly, the head 30 supplies to line 31 an electrical signal which represents the signal magnetically recorded at the timing channel 16 on the magnetic record. This signal may have a wave form of the general type indicated in the drawing, with the start of each positive half cycle of voltage fixed in time (except for variations in the tape speed) and with the duration of each half cycle determined by the 50 cycle per second timing signal. This signal is fed through a voltage amplifier 32 and then through an amplitude limiter 33, which recovers only the peaks of the positive half cycles of the signal. The resulting positive pulses, having a repetition rate of 1500 cycles per second, frequency modulated by a flutter component due to instantaneous variations in the tape speed during playback, are then fed to a shaper 34, which produces a sinusoidal output signal of the same frequency. This signal is then fed to a conventional frequency multiplier **34*a* which raises the nominally 1500 C. P. S. carrier to 9000 C. P. S., frequency modulated by the same flutter component. As is well understood concerning frequency multipliers, the carrier frequency only is multiplied, while the flutter signal by which the carrier is frequency modulated is not multiplied, but remains the same. (For example, such frequency multiplication may be accomplished by a heterodyning arrangement of the general type discussed above for raising the carrier frequency in the information signal reproduction circuit.) The output signal from the frequency multiplier 34*a* is supplied to a frequency demodulator 35** of a conventional design.

If there are instantaneous variations in the tape speed the flutter signal due to such variations will have frequency modulated the 1500 C. P. S. playback signal at line 31, since the start of each half cycle of such signal would vary with such variations in the tape speed. Therefore, if such fluctuations in the tape speed should occur during playback the signal supplied to the demodulator 35 would be modulated in frequency in accordance with such tape speed variations. The demodulator 35 is designed to recover such modulation signals from the multiplied carrier. A conventional low pass filter **35*a*, connected to receive the output from the frequency demodulator 35, passes the low frequency flutter signal to an amplifier 36** and rejects the 9000 C. P. S. carrier. It will be recognized that the frequency multiplication of this carrier facilitates the use of an inexpensive filter which, though effective to reject the carrier, does not introduce appreciable phase shift in the flutter signal.

The flutter signal is amplified by the amplifier 36 and then supplied to the nominally 55.5 kc. oscillator 21 to frequency modulate this oscillator. This may be done by employing a conventional reactance tube oscillator as the oscillator 21, with the flutter signal output from amplifier 36 supplied as the input signal to the reactance tube oscillator to frequency modulate the latter. (One such conventional reactance tube oscillator, by way of illustration, is disclosed at p. 655 in the "Radio Engineer's Handbook" (first edition) by F. E. Terman.) The operation of the reactance tube oscillator 21 is such that if the record tape 11 should tend to speed up, which would increase the reproduction frequencies of the playback signals, the oscillation frequency of the oscillator 21 would be reduced by the flutter signal from the timing channel. Therefore, while the increase in tape speed would tend to increase the sum frequency output signal from the mixer 20, the oscillation frequency at oscillator 21 would decrease, so that the overall result would be to reduce appreciably any variation in the sum frequency signal due to instantaneous changes in the tape speed during playback.

The other magnetic reproducing head 15 has its output connected through line 40 to a demodulation circuit identical to that described above for the head 14. This circuit includes a voltage amplifier 41, an amplitude limiter 42, a mixer 43, and I. F. transformer 44, amplifier 45, amplitude limiter 46, frequency demodulator 47, filter 48 and an output amplifier 49 having its output connected to a recording galvanometer. Each of these components is identical to the corresponding component in the reproducing circuit for channel 12. At the mixer 43, the signals from channel 13 are heterodyned against the output signal from oscillator 21, which is supplied to the mixer by way of a buffer 50. The I. F. transformer 44 passes signal frequencies within the 57 to 63 kc. band only, while the filter 48 passes only the information signal from channel 13 and rejects the heterodyne sum frequency carrier.

*Tape speed control*

In transferring the magnetic record tape 11 from the magnetic recording equipment to the present reproducing mechanism, it sometimes happens that the tape is either stretched or contracted to a length different from its length during the magnetic recording interval. With the drum 10 driven to move the record tape past the playback heads at the same speed as during the magnetic recording interval, such change in the tape length would change correspondingly the frequency response, so that the reproduced signals would have higher or lower frequencies than those actually recorded magnetically. To avoid this, the present invention incorporates a novel arrangement for controlling the drum speed during playback to compensate for such change in the tape length or any other distortions in the reproduction due to non-instantaneous changes in the speed at which the information signal channels move past the magnetic reproducing heads during playback.

To this end, there is provided a control arrangement for drum motor 61 which includes a limiter 62 connected to receive from amplifier 32 the reproduced signal from the timing channel 16 of the magnetic record tape. As already stated, this signal is a 1500 C. P. S. carrier which is pulse width modulated by the 50 C. P. S. timing signal. The output from the limiter 62 is connected to the input of a shaper 63, which feeds into a pulse width demodulator 64. The output signal from the demodulator 64 is the nominally 50 C. P. S. timing signal. This signal is amplified by the amplifier 65 and the amplified signal is supplied to the field windings on the floating stator 67 of a motor B–2. Motor B–2 has its floating stator 67 mounted so as to be free to turn as much as sixty degrees relative to the rotor 66 of this motor. The B–2 rotor 66 is adapted to be connected through a clutch 68 to the rotor 69 of motor B–1. Motor B–1 has a fixed stator 70 carrying field windings which are excited by signals from a 50 C. P. S. standard signal generator 71 through an amplifier 72.

The floating stator 67 of motor B–2 is mechanically coupled to the adjustable arm of a potentiometer 73 which is coupled to a nominally 60 C. P. S. oscillator 74 to control the latter's frequency within a range of ±2.5% of its center frequency (60 C. P. S.). The nominally 60 C. P. S. output from oscillator 74 is connected through amplifier 75 to drive the drum motor 61 at a speed determined by the frequency of oscillator 74.

In effect, the differential motor assembly of the motors B–1 and B–2 acts as a phase detector which responds to any difference in frequency between the reproduced timing signal and the reference signal from source 71.

In the operation of this mechanism, the precise 50 C. P. S. signal from the frequency standard source 71 excites the field windings on the stator 70 of motor B–1 to turn the rotor 69 of motor B–1 at a predetermined synchronous speed. Through clutch 68, the rotor 69 of motor B–1 is adapted to drive the rotor 66 of motor B–2 at the same speed. At the same time, the nominally 50 C. P. S. timing signal from the timing channel 16 on the record tape excites the field windings on the floating stator 67 of motor B–2. As long as the timing signal reproduced from the tape is exactly 50 C. P. S. and in phase with the reference signal from source 71 (which means that the tape is moving past the playback heads at the correct speed), then the floating stator 67 of motor B–2 is stationary and the potentiometer 73 controls oscillator 74 to drive the drum motor at the same speed. However, if there should be a phase difference between the recovered timing signal and the 50 C. P. S. standard, such as would be caused by a difference in frequency, then the stator 67 will turn relative to rotor 66, changing the setting of potentiometer 73 to, in turn, change the frequency of oscillator 74 inversely to the frequency difference between the reproduced timing signal and the 50 C. P. S. standard. That is, if the reproduced timing signal should exceed 50 C. P. S., then the frequency of the signals from oscillator 74 would decrease to slow down the drum to a speed at which the reproduced timing signal would be 50 C. P. S. The converse holds true, since if the reproduced timing signal should fall below 50 C. P. S. the action of the servomechanism would be to increase the drum speed until the reproduced timing signal frequency matches that of the 50 C. P. S. standard.

The control mechanism also includes a brake 76 for the floating stator 67 or motor B–2 controlled by a solenoid K–1 in a manner such that the brake is retracted to its inoperative position, permitting the stator 67 to turn, while solenoid K–1 is deenergized, and when the solenoid K–1 is energized the brake 76 holds the stator 67 against turning. Clutch 68 is under the control of a solenoid K–2 in a manner such that the clutch is engaged as long as solenoid K–2 is de-energized and disengages in response to energization of solenoid K–2. Solenoids K–1 and K–2 are connected in series with 40 ohm resistors 79 and 80, respectively, across a 40 volt D. C. potential source 85 through the contacts 81, 82 of a relay R–1, whose coil is connected to the output side of a rectifier 77 which has its input side connected through line 78 to the output of amplifier 32. The arrangement is such that the rectified reproduction signal from the timing channel 16 energizes relay R–1. The relay contacts 81, 82 open in response to energization of relay R–1 and thereby de-energize the solenoids K–1 and K–2 to retract the brake 76 (permitting stator 67 to turn) and to maintain the clutch 68 engaged (to drive the B–2 rotor 66 from the B–1 rotor 69). Upon interruption of the signal from the timing channel 16, the relay R–1 is de-energized, closing its contacts 81, 82 to complete the energization circuit for solenoids K–1 and K–2 to move brake 76 into braking engagement with the stator 67 and to release clutch 68 to uncouple the rotors 66 and 69.

The relay R–1 is of the type which de-energizes substantially immediately when the output signal from rectifier 77 ceases, but which has a predetermined time delay in becoming energized upon initiation or resumption of the rectified reproduction signal from the timing channel. Thus, the relay incorporates a time delay which permits the B–2 rotor 66 to get up to full speed before the clutch 68 engages to couple together the B–1 rotor 69 and the B–2 rotor 66 and before the B–2 floating stator 67 is released by brake 76, following the initiation or resumption of the timing channel signal. This feature is of considerable advantage in the present assembly since it greatly reduces the time required to stabilize the servomechanism. The magnetic record tape 11 on the rotary drum at each channel has a gap between the end and the beginning of the recorded signal, at which gap there is no signal recorded. Since this is true of the timing signal channel as well as the information channels, as the drum completes successive rotations, to repeat the reproductions at the recording galvanometers, the 50 C. P. S. timing signal to the B–2 stator 67 derived from the timing channel is interrupted and the energization signal for relay R–1 from the timing channel is also interrupted. Relay R–1 then de-energizes immediately, thereby energizing solenoid K–1 to actuate brake 76 to lock the B–2 stator 67 in place and energizing solenoid K–2 to decouple clutch 68 to disconnect the drive from the B–1 rotor 69 to the B–2 rotor 66. Thus, while the B–1 motor continues to run at synchronous speed during this signal gap on the record, the floating stator 67 of the B–2 motor is held in approximately the synchronous speed position which it occupied just before the timing signal reproduction was interrupted and the rotor 66 of the B–2 motor is uncoupled from the rotor 69 of the B–1 motor. When the timing signal resumes, the B–2 stator 67 remains braked and the rotors 66 and 69 remain uncoupled for a time interval sufficient for the energization of the B–2 stator 67 by the reproduced 50 C. P. S. timing signal to actuate the B–2 rotor 66 up to substantially the synchronous speed of rotation. Then, when the relay R–1 opens its contacts 81, 82 after this time delay, at the instant the brake on the B–2 stator 67 is released and the B–1 and B–2 rotors 69 and 66 are coupled together there is little or no torque on the floating stator 67 of the B–2 motor, and the servomechanism is substantially immediately ready to function properly to control the drum motor speed, as described.

In the absence of the present control arrangement, a considerable time interval would be required for servo-stabilization at the start of each playback interval. Since the phase relationship of the recorded 50 C. P. S. timing signal which energizes the B–2 stator 67 at the beginning and end of this signal is random, the time required for servo stabilization ordinarily would be a function of this phase relationship, and at worst it might require approximately two seconds of the five second playback interval to reach stabilization. The present control arrangement for the servomechanism minimizes "hunting" of the servomechanism to achieve stabilization. With the present control arrangement, the servomechanism is stabilized over substantially the entire signal playback interval, except for a small fraction of a second following the resumption of the signal playback. Since the floating stator 67 of the B–2 motor is braked at the start of the timing signal the effect of random phase relationship of the recovered timing signal at the end and beginning of a timing interval is nullified.

While for the sake of simplifying the present disclosure, only two information channels and the reproducing circuits therefor have been shown, it is to be understood that any number of such channels may be provided, commonly 12 or more in a practical application to geophysical exploration.

From the foregoing, it will be apparent that the illustrated embodiment described in detail above is particularly well adapted to accomplish the purposes of the present invention in an advantageous manner. However, while there has been disclosed herein a particular preferred embodiment of the present invention, it is to be understood that various modifications, omissions and refinements which depart from the disclosed embodiment may be adopted without departing from the spirit and scope of this invention. For example, the principles of the present invention may also be applied in the reproduction of the information signals where the information signals were used to phase modulate a low frequency carrier which was then recorded magnetically, as well as where frequency modulation was employed, as described above. Also, in the drum motor speed control various types of phase detector arrangements other than the specific differential motor assembly described above may be adopted, within the purview of this invention. Likewise, the principles of this invention are applicable to the reproduction from a record on which the timing signal was recorded directly, or as a modulation of another signal different from the pulse width modulation mentioned herein, so that the present invention is not to be construed as being limited to the specific arrangement disclosed.

I claim:

1. Apparatus for reproducing a low frequency information signal from a record on which is recorded a low frequency carrier frequency modulated by the information signal comprising: in combination, reproducing means for reproducing from the recording an electrical signal corresponding to the recorded low frequency carrier modulated in frequency by the information signal, multiplying means connected to said reproducing means for multiplying the frequency of the carrier in said reproduced electrical signal to produce a frequency modulated higher frequency signal consisting of a higher frequency carrier which is modulated in frequency by the information signal, circuit means connected to said multiplying means for passing the frequency modulated higher frequency signal, a frequency demodulator connected to said circuit means and operative to recover the information signal from the higher frequency carrier, and a filter connected to the output of the frequency demodulator for passing the information signal and rejecting the higher frequency carrier.

2. Magnetic reproducing apparatus for reproducing the information signal from a magnetic record having a signal channel on which is recorded an audio frequency carrier frequency modulated by an information signal within the frequency range up to about 500 cycles per second comprising: the combination of means for imparting movement to the magnetic record, a magnetic reproducing head positioned adjacent the path of movement of the magnetic record in playback relation to the recorded signal channel thereon to produce an electrical signal representative of the magnetically recorded audio frequency carrier modulated in frequency by the information signal as the magnetic record moves past the magnetic head, an oscillation generator which produces a signal having a frequency several times that of said audio frequency carrier, a mixer connected to receive the output signal from said magnetic head and to receive the signal produced by said oscillation generator and to heterodyne said signals together and produce a frequency modulated sum frequency signal having a carrier which is the sum of the frequency of the oscillation generator signal and the frequency of the reproduced audio frequency carrier and which is modulated in frequency by the information signal, a tuned circuit connected to the output of said mixer and operative to pass the sum frequency signal therefrom, a frequency demodulator coupled to the output of said tuned circuit and operative to recover the information signal from the sum frequency carrier, and a filter connected to the output of the frequency demodulator and operative to pass the information signal and to reject the sum frequency carrier.

3. Apparatus for reproducing a low frequency information signal from a magnetic record in which the information signal was used to frequency modulate a low frequency carrier which was then recorded magnetically on the record and in which a constant frequency timing signal was recorded magnetically on the record comprising: the combination of means for imparting movement to the magnetic record, a magnetic reproducing head positioned to reproduce from the magnetic record in response to the latter's movement an electrical signal corresponding to the magnetically recorded low frequency carrier modulated in frequency by the information signal, a reactance tube oscillator, a mixer connected to heterodyne the oscillator signal and said electrical signal corresponding to the magnetically recorded signal to produce a frequency modulated sum frequency signal having a sum frequency carrier which is the sum of the frequency of said oscillator signal and the frequency of said low frequency carrier and which is modulated in frequency by the information signal, means for reproducing the timing signal from the magnetic record in response to the latter's movement, means for controlling the operating frequency of said oscillator in response to the frequency of the reproduced timing signal to change the operating frequency of the oscillator inversely to changes in the frequency of the reproduced timing signal resulting from instantaneous variations in the speed of the magnetic record to compensate for such speed changes, a frequency demodulator for recovering the information signal from the sum frequency carrier, means for passing the frequency modulated sum frequency signal from said mixer to the input of said frequency demodulator, and a filter connected to the output of the frequency demodulator for passing the information signal and rejecting the sum frequency carrier.

4. Apparatus for reproducing a low frequency information signal from a movable magnetic record containing an information channel having recorded thereon a low frequency carrier frequency modulated by the information signal and a timing channel in which a timing signal was recorded magnetically, comprising: the combination of means for reproducing in the form of an electrical signal the recorded signal in the information channel, means for reproducing in the form of an electrical signal the magnetically recorded timing signal, frequency multiplier means for increasing the frequency of the carrier in the reproduced information channel signal, means controlling the operation of said frequency multiplier means in response to the reproduced timing signal to vary the increased carrier frequency inversely with variations in the frequency of the reproduced timing signal, means for frequency demodulating the reproduced information channel signal having the carrier of increased frequency, and means for recovering the information signal from said frequency demodulating means.

5. Apparatus for reproducing an information signal from a record on which is recorded a carrier frequency modulated by the information signal and on which a timing signal was recorded, comprising: means for reproducing in the form of a first electrical signal the recorded carrier modulated in frequency by the information signal, means for reproducing in the form of an electrical signal the recorded timing signal, frequency multiplier means for increasing the frequency of the frequency modulated carrier in said first reproduced signal, means controlling the operation of said frequency multiplier means in response to the frequency of the reproduced timing signal to vary the increased carrier frequency of said first reproduced signal inversely with variations in the frequency of the reproduced timing signal, means for frequency demodulating said first reproduced signal following the latter's increase in carrier frequency, and means for recovering the information signal from said frequency demodulating means.

6. In apparatus for reproducing a magnetically recorded information signal from a movable magnetic record on which a constant frequency timing signal was also recorded, the combination of a drive motor for moving the magnetic record during playback, means for reproducing the timing signal from the magnetic record in response to movement of the magnetic record during playback, variable speed control means connected to the drive motor to control the speed at which the drive motor moves the magnetic record during playback, and a control for said variable speed control means including a first motor having a rotor and a floating stator carrying field windings and mounted to turn about the rotor, means for applying the reproduced timing signal to the field windings on said stator, a second motor having a rotor and a fixed stator carrying field windings, a signal generator connected to the field windings on the stator of the second motor to apply thereto a signal at a precise frequency equal to the nominal frequency of the recorded timing signal to turn the rotor of the second motor at synchronous speed, a clutch acting between the rotors of the respective motors for imparting the drive from the rotor of the second motor to the rotor of the first motor, said clutch being normally disengaged, a brake for the floating stator of the first motor normally engaging said stator to prevent it from turning, means energized in response to the reproduced timing signal to retract said brake and to cause said clutch to engage after a time delay, following the initiation or resumption of the reproduced timing signal, sufficient for the rotor of the first motor to be turning at substantially synchronous speed in response to the reproduced timing signal applied to the field windings on the stator of the first motor, and a connection from said floating stator on the first motor to said variable speed control means to control the latter's operation in response to the position of said floating stator to control the drive motor speed so as to equalize the frequency of the reproduced timing signal and the frequency of the signal from said signal generator.

7. In apparatus for reproducing a magnetically recorded information signal from a movable magnetic record on which a constant frequency timing signal was also recorded, the combination of a drive motor for moving the magnetic record during playback, means for reproducing the timing signal from the record in response to movement of the record during playback, a variable frequency oscillator controlling the speed of said drive motor to thereby control the speed at which the record moves during playback, an adjustable frequency control potentiometer controlling the frequency of said oscillator, and a control for said potentiometer including a first motor having a rotor and a floating stator carrying field windings and mounted to turn a limited amount about the rotor, means for applying the reproduced timing signal to the field windings on said stator, a second motor having a rotor and a fixed stator carrying field windings, a standard signal source connected to said field windings on the stator of the second motor to apply thereto a signal at a precise frequency equal to the nominal frequency of the recorded timing signal to turn the rotor of the second motor at synchronous speed, a normally disengaged clutch acting between the rotors of the respective motors for selectively imparting the drive from the rotor of the second motor to the rotor of the first motor, a solenoid controlling said clutch and normally energized to maintain said clutch disengaged, a brake for the floating stator of the first motor, a solenoid controlling said brake and normally energized to maintain said brake engaging the floating stator of the first motor to prevent it from turning, a relay controlling the energization of said solenoids for de-energization of said solenoids when the relay is energized and for energization of said solenoids when the relay is de-energized, means for energizing said relay in response to the reproduced timing signal to de-energize said solenoids for disengagement of said brake and engagement of said clutch after a time delay, following the initiation or resumption of the reproduced timing signal, sufficient for the rotor of the first motor to be actuated to turn at substantially synchronous speed in response to the reproduced timing signal applied to the field windings on the stator of the first motor, and a connection from the floating stator on the first motor to said potentiometer to control the potentiometer setting in response to the position of the floating stator to thereby control the drive motor speed so as to equalize the frequencies of the reproduced timing signal and the signal from said standard source.

8. Apparatus for reproducing a low frequency information signal from a record on which the information signal was recorded by angularly modulating a low frequency carrier comprising: in combination, means for reproducing from the record an electrical signal corresponding to the recorded low frequency carrier modulated angularly by the information signal, means for increasing substantially the frequency of the carrier in said reproduced electrical signal to produce an angular modulation higher frequency signal consisting of a higher frequency carrier modulated angularly by the information signal, a demodulator connected to recover the information signal from said higher frequency carrier, and a filter connected to the output of the demodulator for passing the information signal and rejecting the higher frequency carrier.

9. Apparatus for reproducing a low frequency information signal from a magnetic record in which the information signal was used to frequency modulate a first low frequency carrier which was then recorded magnetically and in which a constant frequency timing signal was used to pulse width modulate a second low frequency carrier which was then recorded magnetically comprising: in combination, a drive motor for moving the magnetic record during playback, means responsive to the movement of the record during playback for reproducing in the form of a first electrical signal the recorded first low frequency carrier frequency modulated by the information signal, means responsive to the movement of the record during playback for reproducing in the form of an electrical signal the recorded second low frequency carrier pulse width modulated by the timing signal, a reactance tube oscillator having a mean frequency several times the frequency of the reproduced first low frequency carrier, a mixer connected to heterodyne the oscillator signal and said first reproduced signal to produce a frequency modulated sum frequency signal which consists of a sum frequency carrier, which is the sum of the frequency of said oscillator signal and the frequency of the reproduced first low frequency carrier, modulated in frequency by the information signal, means for separating the reproduced second low frequency carrier from the timing signal, means for multiplying the frequency of said reproduced second low frequency carrier, means for controlling the frequency of said oscillator in response to the frequency of the frequency multiplied reproduced second carrier to change the oscillator frequency inversely with changes in the frequency of the reproduced second carrier resulting from instantaneous variations in the speed of the magnetic record during playback to compensate for such speed changes, means for passing the frequency modulated sum frequency signal from the mixer, a frequency demodulator connected to said last mentioned means for recovering the information signal from the sum frequency carrier, a filter connected to the output of the frequency demodulator to pass the reproduced information signal and to reject the sum frequency carrier, variable speed control means connected to the drive motor to control the speed at which the drive motor moves the record during playback, and a control for said speed control means including a signal generator, which produces a reference signal at a precise frequency equal to the nominal frequency of the recorded timing signal, a phase detector connected to compare the reproduced timing signal and the reference signal, and means responsive to said phase detector connected to control said variable speed control means to vary the speed at which the drive motor moves the record to correct for errors in the frequency relationship between the reproduced timing signal and the reference signal caused by errors in the record speed during playback.

References Cited in the file of this patent

UNITED STATES PATENTS

| | | |
|---|---|---|
| 1,697,042 | Brown | Jan. 11, 1929 |
| 2,266,713 | Meier | Dec. 16, 1941 |
| 2,279,660 | Crosby | Apr. 14, 1942 |
| 2,334,510 | Roberts | Nov. 16, 1943 |
| 2,349,886 | Roberts | May 30, 1944 |
| 2,370,720 | Donley | Mar. 6, 1945 |
| 2,419,195 | Begun | Apr. 22, 1947 |
| 2,678,821 | Masterson | May 18, 1954 |